United States Patent
He et al.

(10) Patent No.: US 11,898,265 B2
(45) Date of Patent: Feb. 13, 2024

(54) METHOD FOR PREPARING CARBON MATERIAL

(71) Applicant: Qingdao University of Science & Technology, Qingdao (CN)

(72) Inventors: Yan He, Qingdao (CN); Dianming Chu, Qingdao (CN); Wenjuan Bai, Qingdao (CN); Qianpeng Dong, Qingdao (CN)

(73) Assignee: Qingdao University of Science & Technology, Qingdao (CN)

( * ) Notice: Subject to any disclaimer, the term of this patent is extended or adjusted under 35 U.S.C. 154(b) by 0 days.

(21) Appl. No.: 17/695,063

(22) Filed: Mar. 15, 2022

(65) Prior Publication Data
US 2023/0212775 A1    Jul. 6, 2023

(30) Foreign Application Priority Data

Jan. 6, 2022   (CN) .......................... 202210007412.2

(51) Int. Cl.
*C25D 9/08*    (2006.01)
*C25D 21/12*   (2006.01)

(52) U.S. Cl.
CPC .............. *C25D 9/08* (2013.01); *C25D 21/12* (2013.01)

(58) Field of Classification Search
None
See application file for complete search history.

(56) References Cited

U.S. PATENT DOCUMENTS

| | | | |
|---|---|---|---|
| 2004/0185670 A1* | 9/2004 | Hamelin | C25D 11/02 257/E21.252 |
| 2009/0311166 A1* | 12/2009 | Hart | C01B 32/162 977/773 |
| 2019/0315624 A1* | 10/2019 | Douglas | C25B 15/08 |

FOREIGN PATENT DOCUMENTS

CN    111979565 A   * 11/2020

OTHER PUBLICATIONS

Deng et al. Chem. Eur. J. 2014, 20, 4993-4999 (Year: 2014).*
Hu et al. CN 111979565 A, machine translation (Year: 2020).*
Sagara et al. Applied Surface Science 292 '2014' 39-43 (Year: 2014).*

* cited by examiner

*Primary Examiner* — Wojciech Haske

(57) ABSTRACT

Disclosed is a method for preparing a carbon material, comprising applying a voltage to an electrically conductive medium to form an electrically conductive path in an oxygen-free environment containing a carbon source and a catalyst to obtain the carbon material, wherein the electrically conductive medium includes a solid substrate or a liquid-phase electrically conductive system; under the condition that the electrically conductive medium is the liquid-phase electrically conductive system, the carbon material is obtained in the liquid-phase electrically conductive system; and under the condition that the electrically conductive medium is the solid substrate, the carbon material is obtained on a surface of the solid substrate.

2 Claims, 5 Drawing Sheets

METHOD FOR PREPARING CARBON MATERIAL

RELATED APPLICATIONS

This patent application claims the benefit and priority of Chinese Patent Application No. 202210007412.2, filed on Jan. 6, 2022; the entirety of which is hereby incorporated herein by reference.

TECHNICAL FIELD

The present disclosure relates to the technical field of chemical industry and materials, and in particular to a method for preparing a carbon material.

BACKGROUND ART

Carbon materials, which are composed of carbon element and have no constant structure and properties, include graphene and carbon nanotubes. They have excellent mechanical, electrical and thermal properties, and are widely used in industries and fields such as microcircuits, interface enhancement, and lightweighting. Key factors for preparing carbon materials are carbon source, energy, catalyst and substrate. Different energy supplies and methods might affect industrialization efficiency and cause resource waste.

At present, methods for preparing a carbon material include a chemical vapor deposition (CVD) and a fluidized-bed method. The fluidized-bed method is to grow a carbon material in a fluidized bed, during which a carbon source gas blows a catalyst to form a flowing state, and then is grown into the carbon material at a high temperature. For example, Chinese patent CN106395795A discloses a continuous fluidized-bed method for preparing carbon nanotubes, which comprises catalyst reduction and activation, and carbonization reaction, wherein the catalyst reduction and activation is carried out in a conventional fluidized bed reactor, and the carbonization reaction is carried out in a carbon nanotube growth reactor, which is a fluidized bed reactor that is divided into an upper section and an lower section; during the carbonization reaction, the reduced and activated catalyst is continuously introduced into the carbon nanotube growth reactor, and the carbon nanotube growth reaction process is carried out in the upper section of the fluidized bed having a relatively larger inner diameter, thus realizing a continuous preparation. The chemical vapor deposition is performed by pretreating carbon fibers, then feeding the pretreated carbon fibers into a CVD furnace, and introducing a carbon source and a catalyst, and then growing the carbon fibers at a high temperature, wherein the carbon source is a gas such as propylene, and the catalyst is a solid particle such as iron nitrate. For example, Ge Xiang et al. used ethylene as a carbon source and unloaded Cu—Ni alloy as a catalyst to prepare a carbon nano-fiber monoliths with excellent performance by catalytic chemical vapor deposition (Ge Xiang, Wu Xiao-long, Wang Ji-tong, et al. Synthesis of carbon nanofiber monoliths by chemical vapor deposition [J], New Carbon Materials, 2015, 30(001): 54-62).

Existing methods for preparing a carbon material have disadvantage of complex preparation process.

SUMMARY

In view of the above, an object of the present disclosure is to provide a method for preparing a carbon material. The method of the present disclosure has a simple process and is convenient for industrial application.

In order to realize the above object, the present disclosure provides the following solutions:

The present disclosure provides a method for preparing a carbon material, comprising applying a voltage to an electrically conductive medium to form an electrically conductive path in an oxygen-free environment containing a carbon source and a catalyst to obtain the carbon material, wherein the electrically conductive medium comprises one selected from the group consisting of a solid substrate and a liquid-phase electrically conductive system;

under the condition that the electrically conductive medium is the liquid-phase electrically conductive system, the carbon material is obtained in the liquid-phase electrically conductive system; and under the condition that the electrically conductive medium is the solid substrate, the carbon material is obtained on a surface of the solid substrate.

In some embodiments, the carbon source comprises at least one selected from the group consisting of an organic carbon source and an inorganic carbon source, wherein the organic carbon source comprises one selected from the group consisting of an alcohol, an olefin, and an alkane, and the inorganic carbon source comprises one selected from the group consisting of CO and $CO_2$.

In some embodiments, the alcohol is selected from the group consisting of ethanol and ethylene glycol, the olefin is selected from the group consisting of polyethylene and propylene, and the alkane is methane.

In some embodiments, the catalyst comprises a transition metal element.

In some embodiments, the catalyst comprises a transition metal elementary substance.

In some embodiments, the solid substrate is selected from the group consisting of carbon fibers and an electrically conductive metal, and the liquid-phase electrically conductive system is an electrolyte solution.

In some embodiments, the solid substrate is subjected to an activation before using, the activation is performed by immersing the solid substrate with an inorganic strong acid solution, or immersing the solid substrate with an electrolyte solution and then subjecting a system obtained after the immersing to an electrolysis, or immersing the solid substrate with a buffer solution.

In some embodiments, both the catalyst and the electrically conductive medium are iron-based.

In some embodiments, the oxygen-free environment is one selected from the group consisting of a vacuum environment, a solution and a protective atmosphere.

In some embodiments, the carbon source is selected from the group consisting of ethanol and ethylene glycol, the catalyst is iron, the electrically conductive medium is carbon fibers, the oxygen-free environment is provided by one selected from the group consisting of ethanol and ethylene glycol, and the formed electrically conductive path has a current of 1.5-5 A and a voltage of 10-40 V.

The present disclosure provides a method for preparing a carbon material, comprising applying voltage to an electrically conductive medium to form an electrically conductive path in an oxygen-free environment containing a carbon source and a catalyst to obtain the carbon material, wherein the electrically conductive medium comprises one selected from the group consisting of a solid substrate and a liquid-phase electrically conductive system; under the condition that the electrically conductive medium is the liquid-phase electrically conductive system, the carbon material is obtained in the liquid-phase electrically conductive system; and under the condition that the electrically conductive medium is the solid substrate, the carbon material is obtained on a surface of the solid substrate. In the present disclosure, the electrically conductive path is used to prepare a carbon material, and after electrifying, the energy is supplied by electric energy, resulting in an electrocatalysis. No matter whether the carbon source is a gas, a solid or a liquid, after electrifying, the electric energy breaks the bonds of the carbon source to generate free carbon atoms, which are quickly assembled in the presence of a catalyst to form a carbon material. Moreover, the preparation process according to the present disclosure is simple, does not need high-temperature condition and introduction of various dangerous gases, and has low energy consumption, low cost and low requirements on equipment, allowing to prepare the carbon material at ambient temperature and easily realize industrial application.

In the present disclosure, various carbon materials, comprising one selected from the group consisting of graphene, carbon nanotubes, and carbon fibers, may be obtained by adjusting current, resistance, voltage, or time.

In some embodiments, the solid substrate is subjected to an activation before using, the activation being performed using an inorganic strong acid or a buffer solution. The activation makes it possible to increase surface reactive bonds of the solid substrate, which is beneficial to the growth of the carbon material on the surface of the solid substrate.

In the present disclosure, the carbon material could grow in a solution without sealing, and the obtained carbon material could be well dispersed therein.

DETAILED DESCRIPTION OF THE EMBODIMENTS

Figure 1:
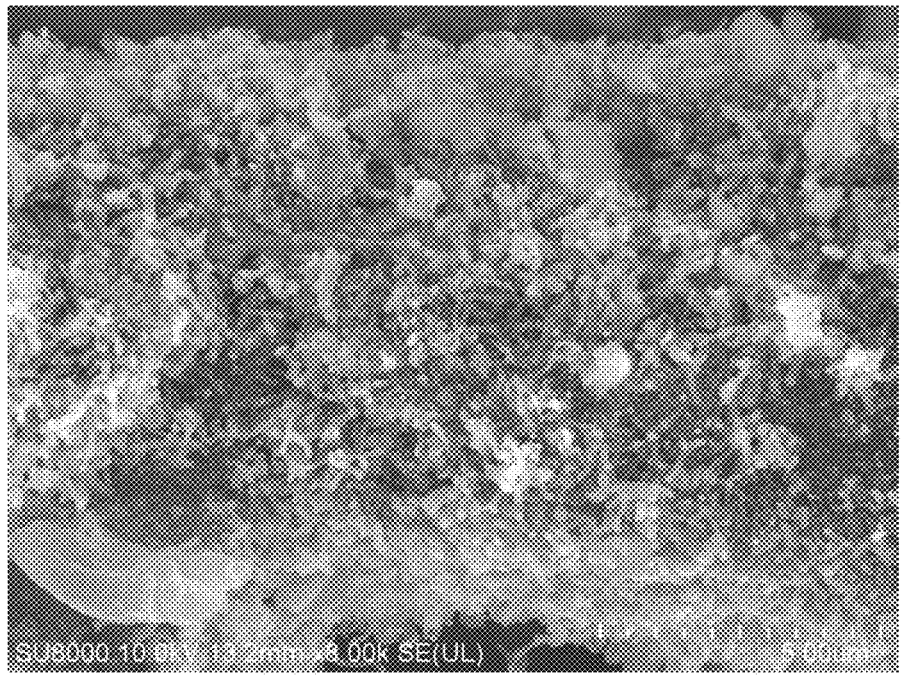
FIG. 1 is an electron micrograph of the carbon material obtained on the surface of the carbon fibers according to Example 1.

The present disclosure provides a method for preparing a carbon material, comprising applying a voltage to an electrically conductive medium to form an electrically conductive path in an oxygen-free environment containing a carbon source and a catalyst to obtain the carbon material, wherein the electrically conductive medium comprises one selected from the group consisting of a solid substrate and a liquid-phase electrically conductive system;

under the condition that the electrically conductive medium is the liquid-phase electrically conductive system, the carbon material is obtained in the liquid-phase electrically conductive system; and under the condition that the electrically conductive medium is the solid substrate, the carbon material is obtained on a surface of the solid substrate.

In some embodiments, the carbon source comprises at least one selected from the group consisting of an organic carbon source and an inorganic carbon source. In some embodiments, the organic carbon source comprises one selected from the group consisting of an alcohol, an olefin, and an alkane. In some embodiments, the inorganic carbon source comprises one selected from the group consisting of CO and $CO_2$. The carbon source plays a role of providing carbon element.

In some embodiments, the alcohol is ethanol or ethylene glycol. In some embodiments, the olefin is polyethylene or propylene. In some embodiments, the alkane is methane.

In some embodiments, the catalyst comprises a transition metal element. The catalyst plays a role of catalyzing the reaction of the carbon source.

In some embodiments, the catalyst comprises a transition metal elementary substance. In some embodiments, the transition metal elementary substance is a transition metal elementary substance particle.

In some embodiments, the transition metal elementary substance is selected from the group consisting of Fe, Co, and Ni.

In some embodiments, the transition metal elementary substance is directly used as the catalyst, or the catalyst is obtained by reducing a transition metal nitrate, a transition metal chloride, a transition metal sulfate or a transition metal oxide.

In some embodiments, the reducing is performed by adding an active metal for a displacement reaction, or subjecting the transition metal oxide to a reduction reaction with hydrogen in a gas atmosphere, or electrifying in a solution state. In the present disclosure, there is no special limitation on the specific means of subjecting the transition metal oxide to a reduction reaction with hydrogen, and any means well known to those skilled in the art may be used.

In some embodiments, the active metal is selected from the group consisting of Al, Mg, Cu, and Fe.

In some embodiments, the catalyst is obtained by subjecting the transition metal nitrate or the transition metal chloride to a displacement reaction with an active metal.

In some embodiments, the catalyst is obtained by subjecting the transition metal oxide to a reduction reaction with an active metal or hydrogen.

In some embodiments, the catalyst is obtained by reducing with hydrogen.

In some embodiments, the transition metal nitrate is selected from the group consisting of iron nitrate, nickel nitrate, and cobalt nitrate.

In some embodiments, the transition metal chloride is selected from the group consisting of iron chloride, nickel chloride, and cobalt chloride.

In some embodiments, the solid substrate is selected from the group consisting of carbon fibers, Fe, and Al.

In some embodiments, under the condition that the electrically conductive medium is a solid substrate, the preparation method comprises electrifying the solid substrate (by directly connecting two ends of the solid substrate to an anode and a cathode respectively) in an oxygen-free environment, converting the carbon source on a surface of the solid substrate to the carbon material in situ in the presence of a catalyst and a current under a state of electrifying.

In some embodiments, under the condition that the electrically conductive medium is a solid substrate, and the carbon source is an alcohol, the preparation method comprises placing the solid substrate into the alcohol containing the catalyst therein, applying a voltage to (i.e. electrifying) the solid substrate to form an electrically conductive path to obtain the carbon material on a surface of the solid substrate. In some embodiments, under the condition that the catalyst is a transition metal elementary substance, the transition metal elementary substance is obtained by a displacement reaction with an active metal, such as a reaction of iron nitrate with Al to obtain an iron elementary substance as the catalyst.

In some embodiments, under the condition that the electrically conductive medium is a solid substrate, the carbon source is selected from the group consisting of an alkane, CO, and $CO_2$, and the alkane is a gas, the preparation method comprises dispersing the alkane, CO, or $CO_2$ in a space, placing the catalyst on a surface of the solid substrate, and applying a voltage to (i.e. electrifying) the solid substrate to form an electrically conductive path to obtain the carbon material on the surface of the solid substrate.

In some embodiments, under the condition that the electrically conductive medium is a solid substrate, the carbon source is an olefin, and the olefin is a liquid, the preparation method comprises coating the olefin and the catalyst on a surface of the solid substrate, and applying a voltage to (i.e. electrifying) the solid substrate to form an electrically conductive path to obtain the carbon material on the surface of the solid substrate.

In some embodiments, under the condition that the electrically conductive medium is a solid substrate, the carbon source is an olefin, and the olefin is a gas, the preparation method comprises dispersing the olefin in a space, placing the catalyst on a surface of the solid substrate, and applying a voltage to (i.e. electrifying) the solid substrate to form an electrically conductive path to obtain the carbon material on the surface of the solid substrate.

In some embodiments, under the condition that the electrically conductive medium is a solid substrate, and the carbon source is polyethylene, the preparation method comprises coating the polyethylene on a surface of the solid substrate, and applying a voltage to (i.e. electrifying) the solid substrate to form an electrically conductive path to obtain the carbon material on the surface of the solid substrate.

In some embodiments, under the condition that the solid substrate is carbon fibers, the preparation method comprises applying a voltage to the electrically conductive medium in an oxygen-free environment containing the carbon source and the catalyst to form an electrically conductive path to obtain the carbon material, thus realizing a modification of the carbon fibers, i.e. modification of a carbon fiber substrate. In some embodiments, the carbon material is carbon nanotubes.

In some embodiments, a multi-scale composite reinforcement formed by the carbon fibers and the carbon nanotubes is not only beneficial to the interface bonding of the composite materials to effectively transfer loads, but also beneficial to the improvement of performance and service life. The carbon fibers with carbon nanotubes on the surface thereof could improve the roughness of the surface of the carbon fibers and the interface performance Further, the carbon nanotubes on the carbon fibers are connected with the resin matrix, which could obviously improve the interaction force between them. Due to the good toughness of the carbon nanotubes, the reinforcement is allowed to bear 40% tension strain without brittle fracture, greatly improving the toughness of the composite material and finally realizing the performance improvement of the carbon fibers composite material. Combining carbon fibers with carbon nanotubes (CNTs) makes up for the inherent defects of carbon fibers, greatly improves the adhesive force between carbon fibers and the substrate, effectively transfers load, and improves the mechanical properties of the composite material.

In some embodiments, the solid substrate is in a static state or a moving state, a power supply is always in contact with a certain section of the solid substrate, and the carbon material is obtained on a surface of the solid substrate.

In some embodiments, the solid substrate is subjected to an activation before using, and the activation comprises immersing the solid substrate with an inorganic strong acid solution or a buffer solution. In some embodiments, the activation is to increase surface active bonds on the solid substrate.

In some embodiments, the inorganic strong acid includes concentrated nitric acid and/or concentrated sulfuric acid. In the present disclosure, there is no special limitation on a concentration of the concentrated nitric acid and the concentrated sulfuric acid, and any concentration well known to those skilled in the art may be used. Under the condition that the inorganic strong acid is a mixed solution of the concentrated nitric acid and the concentrated sulfuric acid, a volume ratio of the concentrated nitric acid to the concentrated sulfuric acid in the mixed solution is 3:1.

In some embodiments, the buffer solution is an aqueous solution of ammonium dihydrogen phosphate. In some embodiments, the aqueous solution of ammonium dihydrogen phosphate has a mass percentage of ammonium dihydrogen phosphate of 5%.

In some embodiments, the activation is performed under a condition of electrifying, and the electrifying is performed at a current of 0.4 A for 40-100 s.

In some embodiments, after obtaining the carbon material on the surface of the solid substrate, the method further comprise sequentially drying and purifying the carbon material. In the present disclosure, there is no limitation on the specific means of the drying and purifying, and any means well known to those skilled in the art may be used.

In some embodiments, the liquid-phase electrically conductive system is an electrolyte solution.

In some embodiments, the electrolyte solution is an aqueous solution of a transition metal salt.

In some embodiments, the liquid-phase electrically conductive system is an alcohol solution of a transition metal salt.

In some embodiments, under the condition that the liquid-phase electrically conductive system is an aqueous solution of a transition metal salt or an alcohol solution of a transition metal salt, a transition metal ion in the aqueous solution of a transition metal salt or the alcohol solution of a transition metal salt is reduced to a transition metal elementary substances by a metal displacement reaction.

In the present disclosure, there is no special limitation on the concentration of the aqueous solution of a transition metal salt or the alcohol solution of a transition metal salt, and any concentration well known to those skilled in the art may be used.

In some embodiments, under the condition that the liquid-phase electrically conductive system is an electrolyte solution, the preparation method comprises electrifying the electrolyte solution, and converting a carbon source in the electrolyte solution into the carbon material in the presence of a catalyst and a current under an electrifying state.

In some embodiments, under the condition that the electrically conductive medium is a liquid-phase electrically conductive system and the carbon is an alcohol, the preparation method comprises mixing the liquid-phase electrically conductive system with the alcohol to obtain a mixed system, adding the catalyst thereto, applying a voltage on (electrifying) the mixed system to form an electrically conductive path to obtain a carbon material in the mixed system.

In some embodiments, under the condition that the electrically conductive medium is a liquid-phase electrically conductive system, the carbon source is an olefin, and the olefin is a gas, the preparation method comprises introducing the olefin into the liquid-phase electrically conductive system, applying a voltage on (electrifying) the liquid-phase electrically conductive system to form an electrically conductive path to obtain a carbon material in the liquid-phase electrically conductive system.

In some embodiments, under the condition that the electrically conductive medium is a liquid-phase electrically conductive system, the carbon source is an olefin, and the olefin is a liquid, the preparation method comprises dissolving the olefin into the liquid-phase electrically conductive system, applying a voltage on (electrifying) the liquid-phase electrically conductive system to form an electrically conductive path to obtain a carbon material in the liquid-phase electrically conductive system.

In the present disclosure, there is no special limitation on the shape of the carbon fibers, Fe, and Al, but Fe or Al is preferably in the form of sheet or wire.

In some embodiments, in the preparation method, under the condition that the preparation system contains a solution, Al is added into the preparation system to prepare other carbon materials.

In some embodiments, the oxygen-free environment is a vacuum environment, a solution or a protective atmosphere, preferably a solution.

In some embodiments, under the condition that the electrically conductive medium is a solid substrate, the oxygen-free environment is a vacuum environment or a protective atmosphere.

In some embodiments, under the condition that the electrically conductive medium is a liquid-phase electrically conductive system, the oxygen-free environment is provided by the liquid-phase electrically conductive system.

In some embodiments, the prospective atmosphere is an inert gas atmosphere or nitrogen atmosphere.

In some embodiments, under the condition that the solution contains carbon element, the solution is used as the carbon source. For example, ethanol or ethylene glycol may be used as the carbon source.

In some embodiments, the carbon source is ethanol or ethylene glycol. In some embodiments, the catalyst is iron nitrate. In some embodiments, the electrically conductive medium is carbon fibers. In some embodiments, the oxygen-free environment is provided by the carbon source. In some embodiments, the formed electrically conductive path has a current of 1.5-5 A. In some embodiments, the formed electrically conductive path has a voltage of 10-40 V, preferably 20-30 V. In some embodiments, the carbon material is obtained in ethanol or ethylene glycol. In some embodiments, a carbon material is obtained on the surface of carbon fibers, thus obtaining carbon material modified carbon fibers.

In some embodiments, an amount of the iron nitrate is 0.01-10% of a mass of the carbon source.

In some embodiments, under the condition that the electrically conductive medium is a solid substrate which is used as a carbon source, such as carbon fibers, the catalyst is attached on the surface of the solid substrate.

In some embodiments, under the condition that the electrically conductive medium is a solid substrate which is used as a catalyst, such as a transition metal elementary substance, the carbon source is a gas such as methane or a liquid such as ethylene glycol.

In some embodiments, under the condition that the electrically conductive medium is a solid substrate, the catalyst and the carbon source is attached on the surface of the solid substrate, a carbon material is formed after electrifying, and the carbon source is a liquid or a solid.

In the present disclosure, it is necessary that the carbon source is contacted with the catalyst, and the substrate electrically conductive medium provides electric energy.

In some embodiments, under the condition that the carbon source is a gas, the preparation method comprises under an oxygen-free environment, contacting the electrically medium such as an electrically conductive wire, an electrically conductive sheet, and an electric conductor with the catalyst, introducing the carbon source, and controlling operation conditions such as voltage, current, resistance, and time to produce the carbon material.

In another specific embodiment, both the catalyst and the electrically conductive medium are Fe.

In another specific embodiment, both the carbon source and the electrically conductive medium are carbon fibers.

In order to further describe the present disclosure, the following will describes the method for preparing a carbon material according to the present disclosure in detail in conjunction with examples, but they shall not be understood as a limitation to the protection scope of the present invention.

Figure 10:
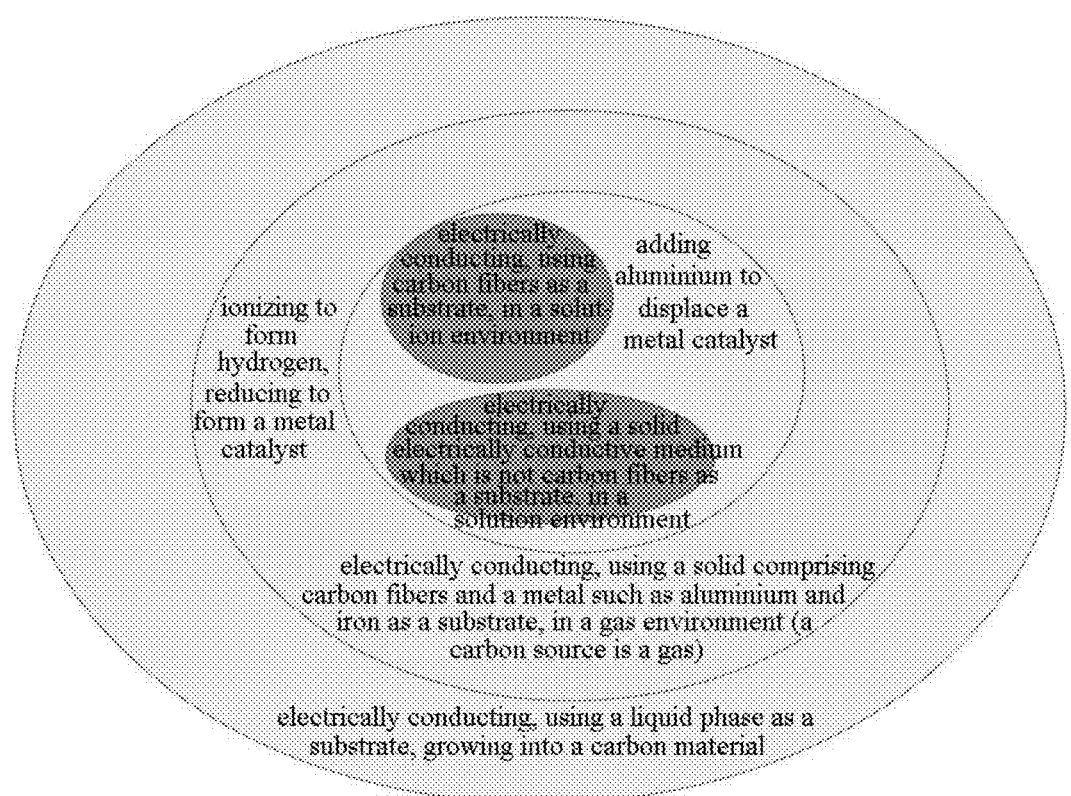
FIG. 10 describes the method for preparing a carbon material according to one or more embodiments of the present disclosure.

FIG. 10 shows the method for preparing a carbon material according to one or more embodiments of the present disclosure.

Example 1

Carbon fibers were used as a substrate, and a voltage was applied to the two ends of the carbon fibers to form an electrically conductive path. The carbon fibers were placed into ethylene glycol, and iron nitrate and an aluminium sheet were added thereto, wherein a concentration of iron nitrate in ethylene glycol was 0.02 mol/L. A power was controlled at 40 W by regulating the voltage and current. After 5 min, a certain amount of a carbon material, i.e. carbon nanotubes, was grown in ethylene glycol and on a surface of the carbon fibers.

FIG. 1 is an electron micrograph of the carbon material obtained on the surface of the carbon fibers according to Example 1, showing that carbon nanotubes are obtained on the surface of the carbon fibers.

Figure 3:
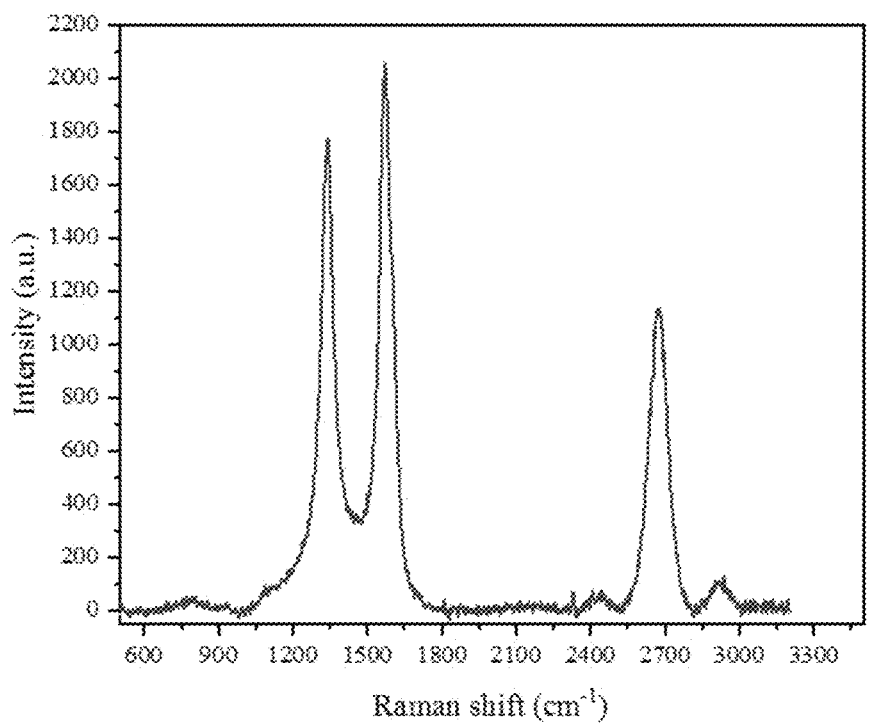
FIG. 3 is a Raman spectrogram of the carbon material according to Example 1.

FIG. 3 is a Raman spectrogram of the carbon material according to Example 1, showing that the grown carbon nanotubes have a high graphitization which indicates a good performance Example 2

The process of this example was the same as that of Example 1, except that the carbon source was ethanol. A power was controlled at 40 W by regulating the voltage and current. After 5 min, a certain amount of a carbon material, i.e. carbon nanotubes, was grown in ethylene glycol and on a surface of the carbon fibers.

Figure 4:
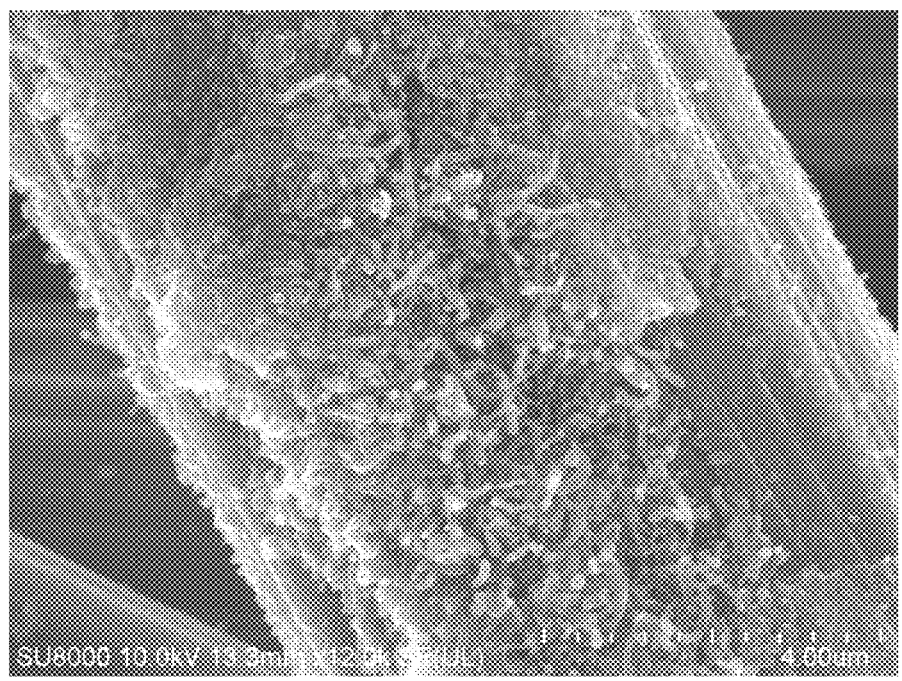
FIG. 4 is an electron micrograph of the carbon material obtained on the surface of the carbon fibers in ethanol according to Example 2.

FIG. 4 is an electron micrograph of the carbon material (i.e. carbon nanotubes) obtained on the surface of the carbon fibers in ethanol according to Example 2.

Figure 5:
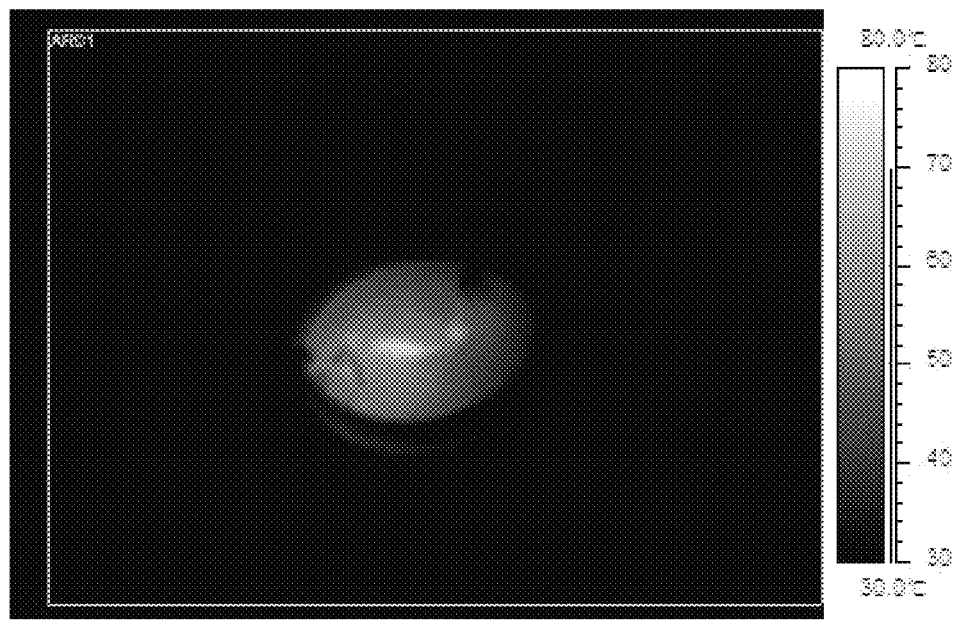
FIG. 5 shows a thermal image of the carbon material prepared in ethanol according to Example 2.

FIG. 5 shows a thermal image of the carbon material prepared in ethanol according to Example 2. It can be seen that during the process of growing the carbon material, the solution nearing the substrate first boiled, and then the whole solution boiled at about 70° C., and the largest ambient temperature did not exceed the boiling temperature.

Example 3

The process of this example was the same as that of Example 2, except that the aluminium sheet was not added. A certain amount of a carbon material (i.e. graphene) was grown in ethanol and the surface of the carbon fibers.

Figure 2:
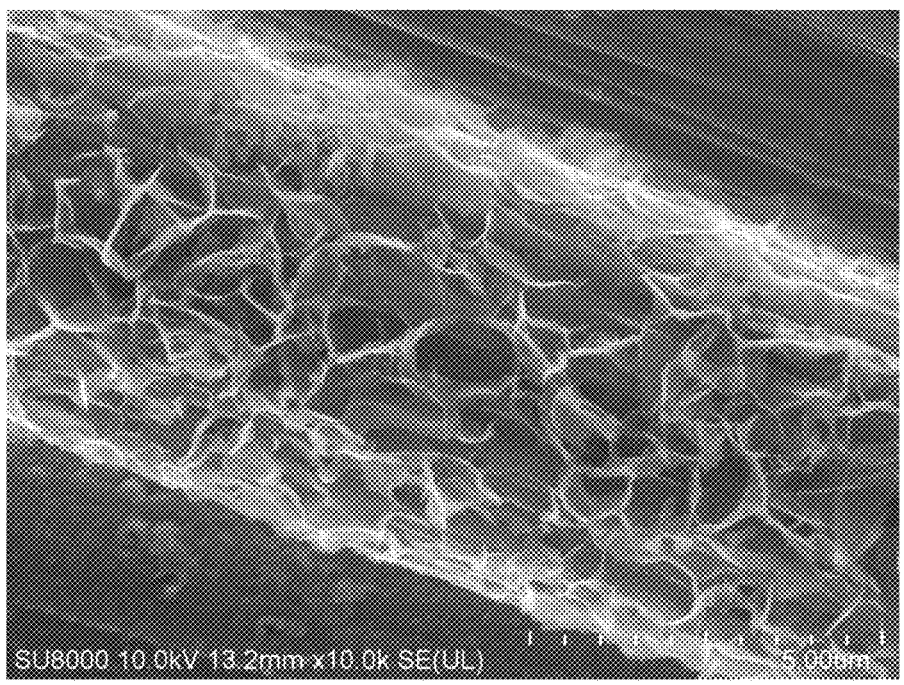
FIG. 2 is an electron micrograph of the carbon material obtained on the surface of the carbon fibers in ethanol according to Example 3.

FIG. 2 is an electron micrograph of the carbon material obtained on the surface of the carbon fibers in ethanol according to Example 3.

Example 4

Figure 6:
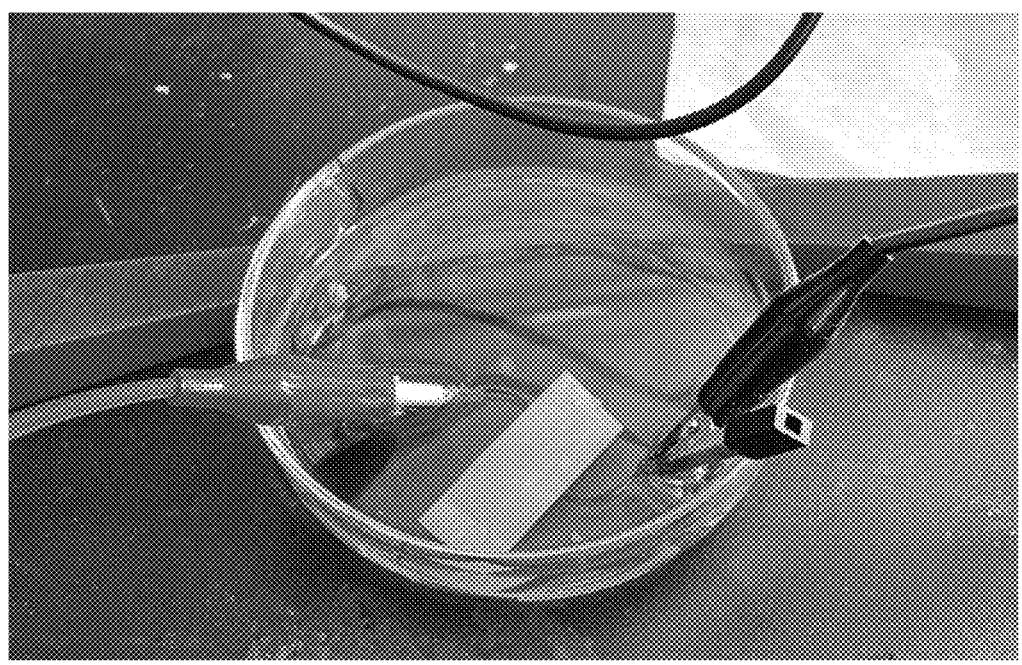
FIG. 6 shows the specific operation for preparing the carbon material in a solution according to Example 4.

The process of this example was the same as that of Example 1, except that an excess aluminium sheet was added into ethylene glycol. A carbon material was grown on the surface of the carbon fibers and in ethylene glycol within a small distance from the carbon fibers. The specific operation is shown in FIG. 6.

Example 5

The process of this example was the same as that of Example 1, except that before using, the carbon fibers were activated by a mixed solution of concentrated sulfuric acid with a concentration of 75 wt % and concentrated nitric acid with a concentration of 68 wt % in a volume ratio of 1:3. A carbon material was grown to modify the interfacial performance of the carbon fibers.

Example 6

An aluminum sheet was used as a substrate, and a voltage was applied to the two ends of the aluminum sheet to form an electrically conductive path. The aluminum sheet was placed into ethylene glycol in which cobalt nitrate was contained. A power was controlled at 60 W by regulating the voltage and current. After 2 min, a certain amount of a carbon material was grown in ethylene glycol and on a surface of the aluminum sheet.

Example 7

Figure 7:
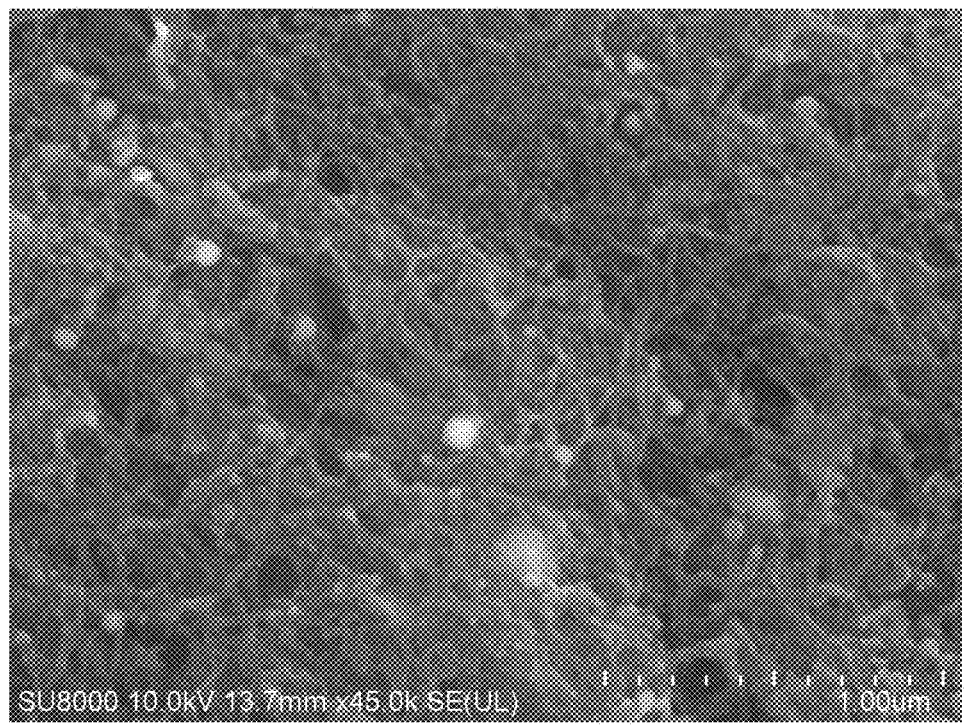
FIG. 7 is an electron micrograph of the carbon material prepared in a gas environment according to Example 7.
Figure 8:
FIG. 8 shows the specific operation for preparing the carbon material in a gas environment according to Example 7.

Carbon fibers were used as a substrate, and a voltage was applied to the two ends of the carbon fibers to form an electrically conductive path. Iron nitrate was dissolved in water, and carbon fibers were immersed therein, wherein a concentration of iron nitrate in water was 2 mol/L. The immersed carbon fibers were placed into a propylene atmosphere, and electrified during which iron nitrate was converted into iron elementary substance. A power was controlled at 40 W by regulating the voltage and current. After 1 second, a carbon material was grown on a surface of the carbon fibers. An electron micrograph of the obtained carbon material is shown in FIG. 7, and the specific operation is shown in FIG. 8.

Example 8

Figure 9:
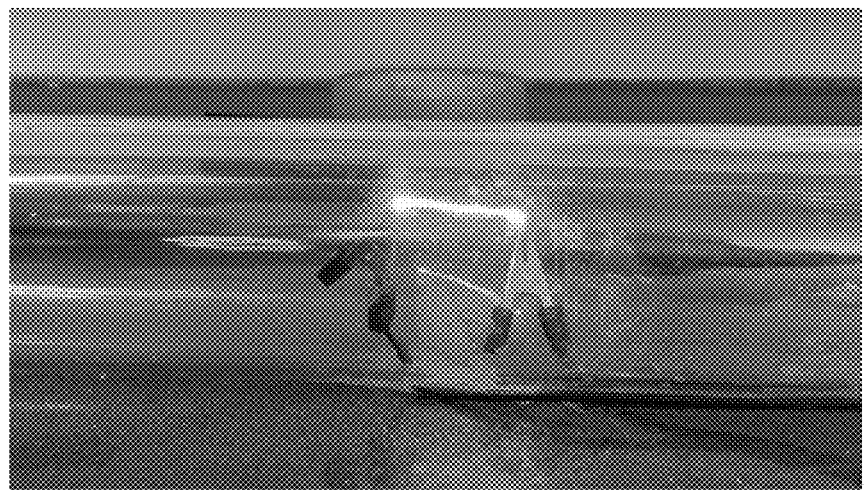
FIG. 9 shows the specific operation for preparing the carbon material in a gas environment according to Example 8.

In an oxygen-free environment, carbon fibers were used as a substrate, and a voltage was applied to the two ends of the carbon fibers to form an electrically conductive path. The carbon fibers were placed into a methane atmosphere. The current was 5 A, and the voltage was 20 V. After about 2 seconds, a carbon material was grown on a surface of the carbon fibers. The specific operation is shown in FIG. 9.

The above is only the preferred embodiments of the present disclosure, and does not limit the present disclosure in any form. It should be pointed out that for those of ordinary skill in the art, several improvements and modifications may be made without departing from the principle of the present disclosure, which shall also be regarded as the protection scope of the present disclosure.

What is claimed is:

1. A method for preparing a carbon material, comprising:
connecting two ends of an electrically conductive medium to an anode and a cathode, respectively; and
applying a voltage to the electrically conductive medium to form an electrically conductive path in an oxygen-free environment containing a carbon source and a catalyst to obtain the carbon material, wherein the electrically conductive medium is a solid substrate;
wherein the carbon material is obtained on a surface of the solid substrate; and
wherein the carbon source is selected from the group consisting of ethanol and ethylene glycol, the catalyst is Fe, the electrically conductive medium is carbon fibers, the oxygen-free environment is provided by one selected from the group consisting of ethanol and ethylene glycol, and the formed electrically conductive path has a current of 1.5-5 A and a voltage of 10-40 V.

2. A method for preparing a carbon material, comprising:
applying a voltage to an electrically conductive medium to form an electrically conductive path in an oxygen-free environment containing a carbon source and a catalyst to obtain the carbon material,
wherein the carbon source is selected from the group consisting of ethanol and ethylene glycol, the catalyst is Fe, the electrically conductive medium is carbon fibers, the oxygen-free environment is provided by one selected from the group consisting of ethanol and ethylene glycol, and the formed electrically conductive path has a current of 1.5-5 A and a voltage of 10-40 V.

* * * * *